United States Patent [19]

Spaleny et al.

[11] 3,824,009

[45] July 16, 1974

[54] FILM VIEWER AND CONTROL APPARATUS

[75] Inventors: George R. Spaleny; Edward W. McCalley, both of Dayton; James H. DeYoung, Miamisburgh, all of Ohio

[73] Assignee: The Standard Register Company, Dayton, Ohio

[22] Filed: May 29, 1973

[21] Appl. No.: 364,229

[52] U.S. Cl. ............................................. 353/27
[51] Int. Cl. ..................... G03b 21/10, G03b 23/08
[58] Field of Search ............................. 353/25–27, 353/74–78

[56] References Cited
UNITED STATES PATENTS 3,071,753   1/1963   Fritze ................................. 353/27
3,330,191   7/1967   King ................................... 353/27

*Primary Examiner*—Louis R. Prince
*Assistant Examiner*—A. Jason Mirabito
*Attorney, Agent, or Firm*—Jacox & Meckstroth

[57] ABSTRACT

Apparatus for viewing film, particularly microfilm, as the film is projected upon a screen, and for automatically controlling data collection mechanism in accordance with information carried upon a selected portion of the film. The apparatus includes means for establishing control circuitry, in accordance with a selected frame or page of an informational or data bearing film and in accordance with a selected item on the frame selected. The control circuit established may be employed to control the operation of any suitable data collection or data applicator mechanism.

16 Claims, 16 Drawing Figures

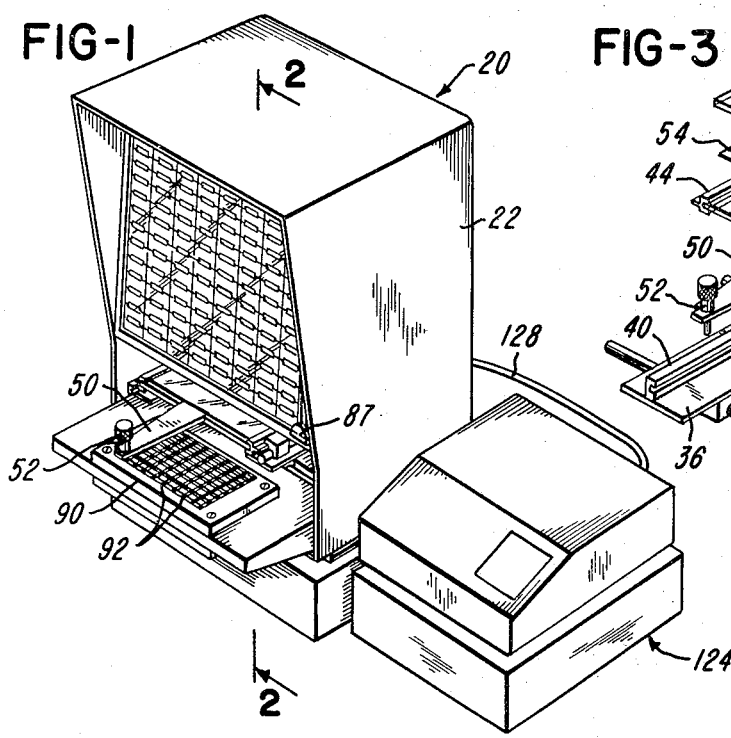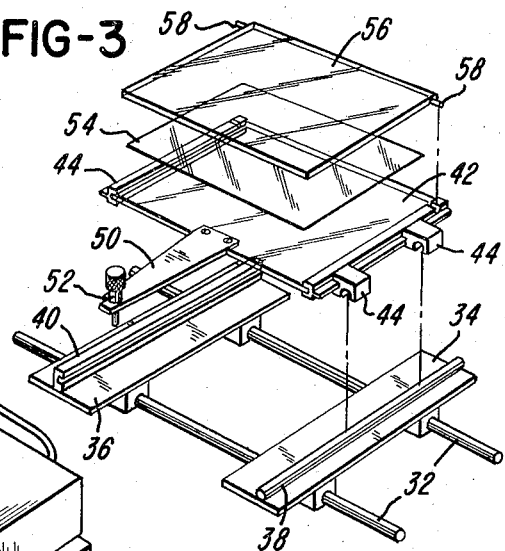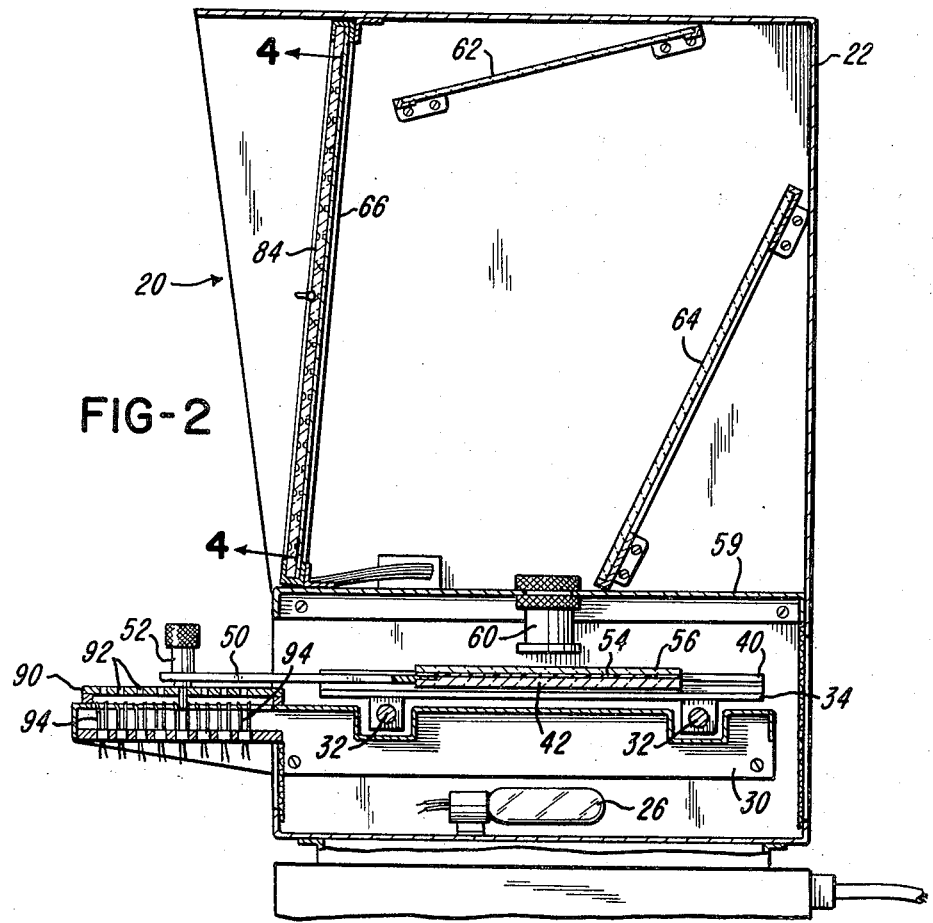

PATENTED JUL 16 1974 3,824,009

FILM VIEWER AND CONTROL APPARATUS

BACKGROUND OF THE INVENTION

Film viewing equipment has been employed for the purpose of projecting data or information upon a screen. Customarily, a film such as a microfiche or the like is selected from a group thereof. Then a page or frame of the film or microfiche is selected. Then an item or bit which appears on the selected page or frame is selected. Then, customarily, a data collection machine or data applicator mechanism or the like is manually operated while the data or information which appears on the selected portion of the selected page or frame is viewed by the operator as the selected information appears upon the screen.

It is an object of this invention to provide means by which a control circuit is automatically established in accordance with a page or frame selected on a data bearing microfilm and in accordance with the information or data appearing on a portion of the page or frame. The control circuit established is employed in controlling the operation of a suitable data collection machine which is connected to the film viewer apparatus.

BRIEF DESCRIPTION OF THE VIEWS OF THE DRAWINGS

FIG. 1 is a perspective view of a microfilm viewer and control apparatus which includes mechanism and circuitry of this invention. This view also shows a typical suitable data collection machine which is connected to the film viewer and control apparatus.

FIG. 2 is an enlarged sectional view taken substantially on line 2—2 of FIG. 1.

FIG. 3 is an exploded perspective view, drawn on substantially the same scale as FIG. 1, showing a portion of the film viewer and control apparatus.

DETAILED DESCRIPTION OF THE INVENTION

Figure 4:
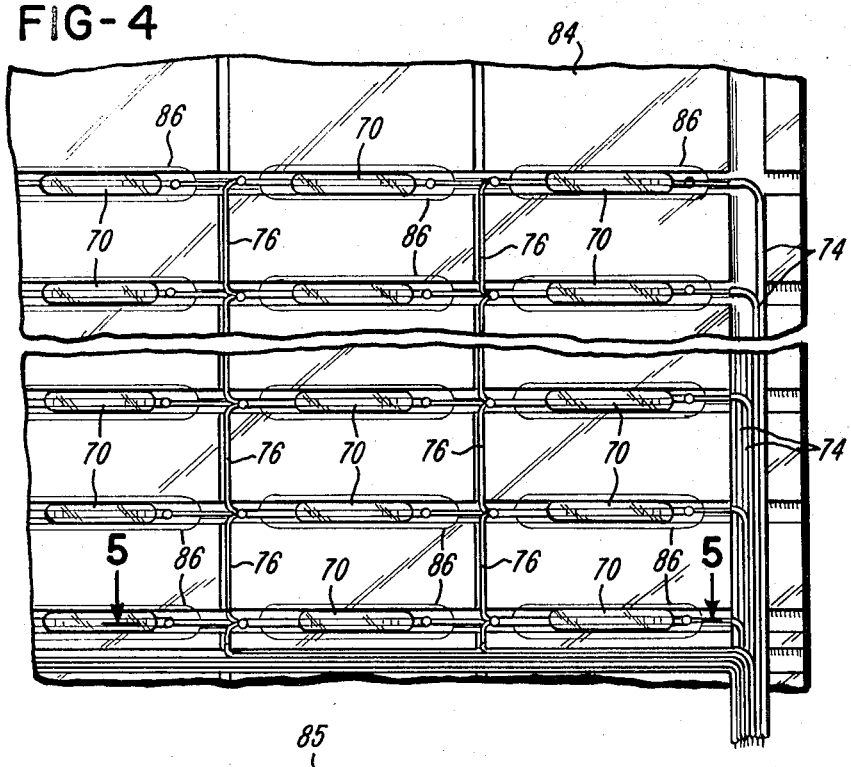
FIG. 4 is an enlarged fragmentary view, with parts broken away, taken substantially on line 4—4 of FIG. 2.

Herein the apparatus of this invention is described in its use in a hospital or medical type of situation in which billing information or records of services to patients or inventory records of supply are transmitted by the apparatus of this invention into a suitable data collection machine. It is to be understood, of course, that the apparatus of this invention may be employed in connection with many other types of businesses, industries, or other situations for transmitting information to suitable data collection mechanism.

The apparatus of this invention is shown generally in FIG. 1 and is referred to by reference numeral 20. The apparatus 20 has a housing 22, at the lower portion of which is a lamp 26, shown in FIG. 2. Above the lamp 26 and mounted on the opposite internal wall portions of the housing 22 are brackets 30, one of which is shown in FIG. 2. The brackets 30 support parallel spaced-apart rods 32 which, as best shown in FIG. 3, support spaced-apart support members 34 and 36. Thus, the support members 34 and 36 are slidably movable along the rods 32.

The support member 34 carries a rail member 38 and the support member 36 carries a channel 40. A lower glass 42 is attached to carrier members 44 which are supported upon the rail 38 and by the channel 40. Thus the lower glass 42 is movable transversely with respect to the rods 32, upon the rail member 38 and upon the channel 40.

Attached to the lower glass 42 is a selector arm 50 which has a stem 52 attached thereto. The lower glass 42 is adapted to support a film 54 as the film 54 is sandwiched between the lower glass 42 and an upper glass 56. The upper glass 56 is preferably pivotally attached to the lower glass 42 by pins 58 or the like, as shown in FIG. 3. Thus, the film 54, as it is retained between the lower glass 42 and the upper glass 56, is movable axially along the rods 32 or transversely of the rods 32 by movement of the selector arm 50.

As shown in FIG. 2, a floor 59 above the upper glass 56, and spaced therefrom, supports a lens holder 60, which houses a lens, not shown, which is adapted to project a portion of the film 54 upwardly to a mirror 62. From the mirror 62 the portion of the film 54 is projected to a mirror 64 and from the mirror 64 to the rear surface of a transparent screen 66.

Figure 5:
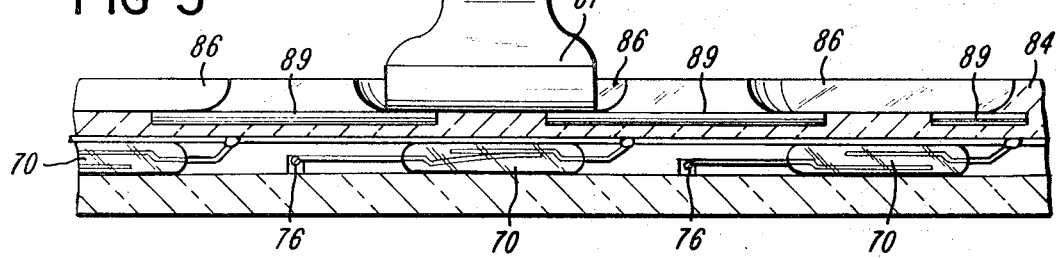
FIG. 5 is a fragmentary sectional view taken substantially on line 5—5 of FIG. 4, and drawn on a slightly larger scale than FIG. 4.
Figure 6:
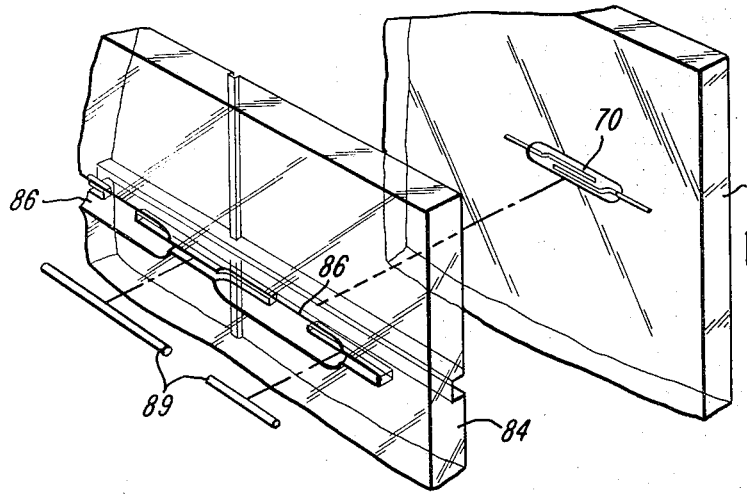
FIG. 6 is a fragmentary perspective exploded view of a part of the structure shown in FIGS. 4 and 5 and drawn on substantially the same scale as FIG. 4.
Figure 10A:
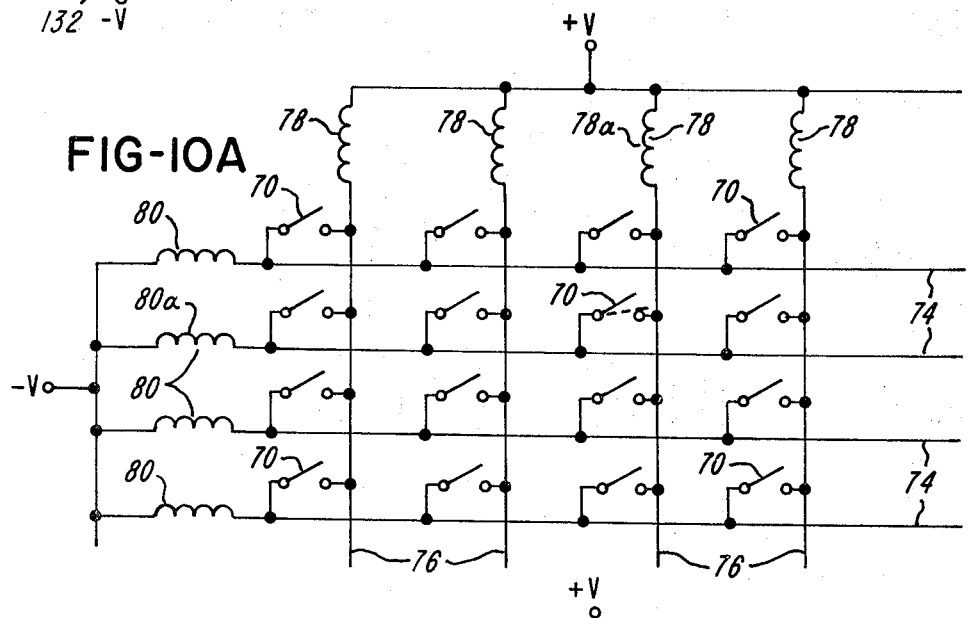
FIG. 10A is a fragmentary schematic electrical wiring diagram of a portion of the electrical circuitry associated with the screen shown in FIGS. 4, 5 and 6.

As shown in FIG. 5, the front surface of the screen 66 has a plurality of electrical switches 70 attached thereto, which are arranged in horizontal and vertical rows, as shown in FIG. 4. Preferably, each of the switches 70 is magnetically operable. FIGS. 4 and 10A show that horizontally extending electrical conductor members 74 and vertically extending electrical conductor members 76 are joined to the switches 70. As illustrated in FIG. 10A, a relay coil 78 is joined to each of the vertically extending electrical conductor members 76, and a relay coil 80 is connected to each of the horizontally extending electrical conductors 74. The relay coils 78 are shown connected to a positive source of electrical energy, and the relay coils 80 are shown connected to a negative source of electrical energy.

Also as shown in FIG. 5, positioned in front of the switches 70 and spaced slightly from the screen 66 is a transparent plate 84. The plate 84 has a plurality of recesses 86 therein, there being one recess 86 immediately in front of each switch 70. Extending between adjacent recesses 86 are magnetizable strips 89.

As shown in FIG. 5, a magnet 87 is positionable within any one of the recesses 86, and in this position, the magnet 87 is located immediately in front of, and closely adjacent, one of the switches 70. A cord 85 is shown attached to the magnet 87 and may also be attached to the housing 22 to assure that the magnet 87 is constantly available for use. The magnetizable strips 89 provide magnetic means to retain the magnet 87 in position. When the magnet is so positioned, the switch 70 immediately rearwardly thereof is closed as a result of the magnetic forces applied by the magnet 87, as illustrated in FIG. 5.

The stem 52 of the selector arm 50 is positioned above a selector plate 90, shown in FIGS. 1, 2, 7, and 8. The selector plate 90 has a plurality of apertures 92 extending therethrough. Below the selector plate 90 is a plurality of switches 94, there being one switch 94 immediately below each of the apertures 92. The stem 52 is movable through any one of the apertures 92 and, when so positioned, engages the switch 94 immediately below the aperture 92 and causes closing of the switch 94.

Figure 10:
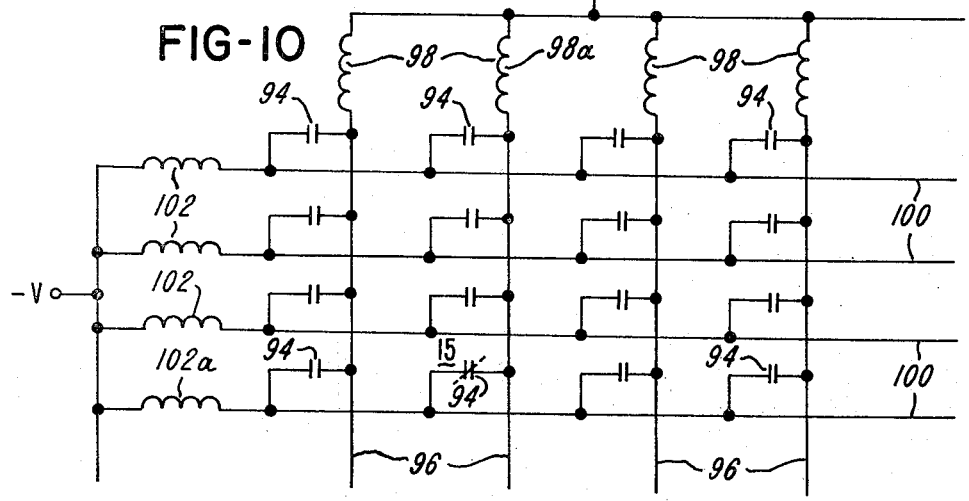
FIG. 10 is a fragmentary schematic electrical wiring diagram of a portion of the electrical circuitry associated with the selector plate shown in FIGS. 7 and 8.

FIG. 10 illustrates schematically the electrical circuitry associated with the switches 94. A plurality of electric conductor members 96 are shown, each of which is connected to a relay coil 98. A plurality of electric conductor members 100 are shown, each of which is connected to a relay coil 102. The relay coils 102 are joined to a source of negative voltage and the relay coils 98 are joined to a source of positive voltage.

Figure 11:
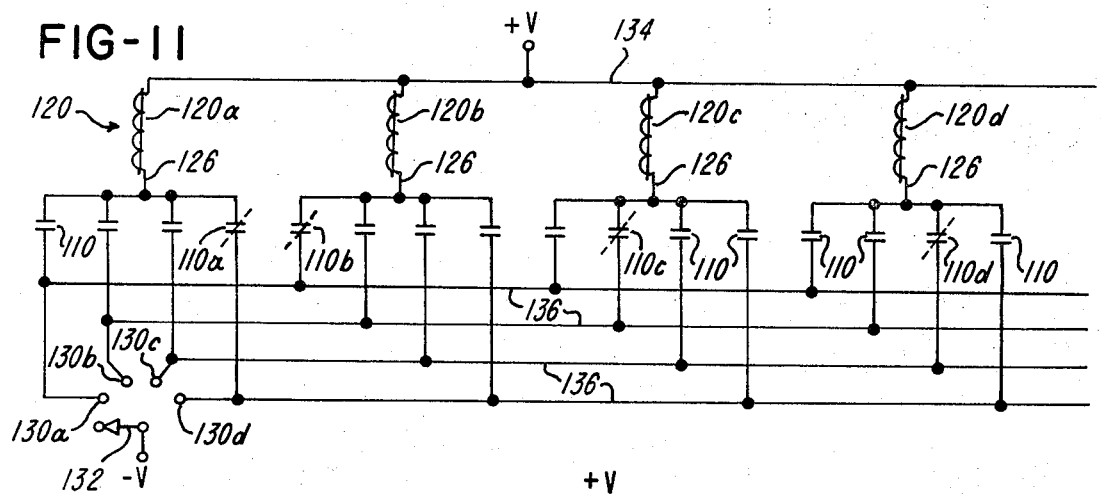
FIG. 11 is a schematic electrical wiring diagram of a portion of the control circuitry of the apparatus of this invention.

The relay coils 78 and 80 shown in FIG. 10A and relay coils 98 and 102 shown in FIG. 10 are associated with sets of relay contacts 110 shown in FIG. 11. There is at least one set of relay contacts 110 for each of the relay coils 78, 80, 98 and 102 and operable thereby. The relay contacts 110 are arranged in groups, and each group is connected to one of a plurality of actuator coils 120 of any suitable data collection machine 124, shown in FIG. 1. For example, a suitable data collection machine 124 may be similar to that disclosed in U.S. Pat. No. 3,361,242 or No. 3,390,629. The data collection machine 124 is joined to the apparatus 20 by electrical conductors 126, shown in FIG. 11, which are positioned within a cable 128, shown in FIG. 1.

Each of the groups of relay contacts 110 is joined to a terminal 130 in a group of the terminals 130a, 130b, 130c, and 130d. A commutator 132 is movable into engagement with any one of the terminals 130 for providing an electrical circuit to one of the groups of relay contacts 110. The commutator 132 and the terminals 132 are preferably external of the apparatus 20. The commutator 132 is shown as being joined to a source of negative voltage, and the actuator coils 120 are shown as being connected to a source of positive voltage. Electric conductor members 134 and 136, shown in FIG. 11, may also be found within the cable 128, shown in FIG. 1.

OPERATION

As stated above, the apparatus of this invention may be employed in any one of numerous types of situations, businesses, industries, and the like. Herein the apparatus is described with regard to use within the hospital or medical situation.

The microfilm 54, as illustrated in FIG. 3, is retained between the lower glass 42 and the upper glass 56. The microfilm 54 may be of the microfiche type, or of any other suitable type which is divided into a plurality of frames, portions, or pages, and in which each frame, portion, or page has a plurality of distinct areas, each of which represents an item on the page or frame.

By movement of the selector arm 50, any desired frame or page on the microfilm 54 may be positioned directly under the lens which is retained within the lens holder 60. The selector plate 90 is divided into areas in accordance with the pages or frames which appear on the microfilm 54. Preferably, one of the frames or pages on the microfilm 54 is an index page, which reveals the titles of all of the pages or frames on the microfilm 54 and the identification or location thereof with respect to the selector plate 90.

Figure 7A:
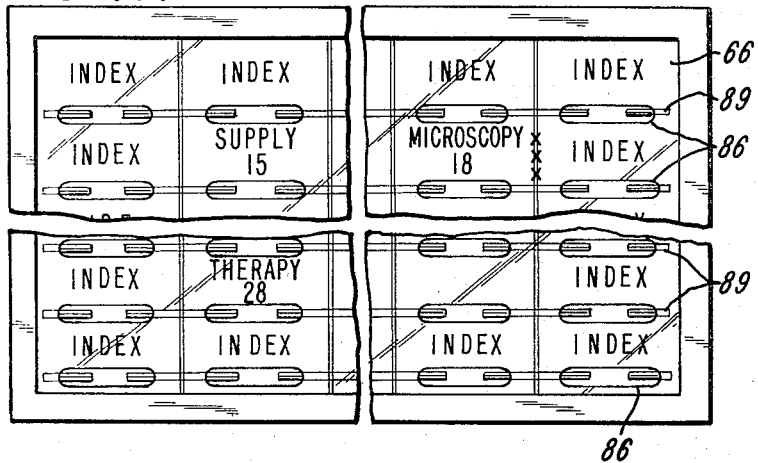
FIG. 7A is an elevational type of view, with parts broken away, of the screen of this invention with a portion of a film projected thereupon.
Figure 7B:
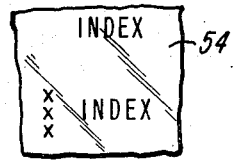
FIG. 7B is a greatly enlarged fragmentary elevational type of view of a portion of the film which is projected upon the screen as shown in FIG. 7A.
Figure 7:
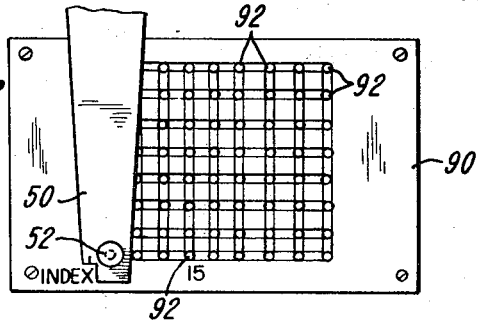
FIG. 7 is an elevational type of view of the selection plate and a portion of the selector arm of the apparatus of this invention.
Figure 9:
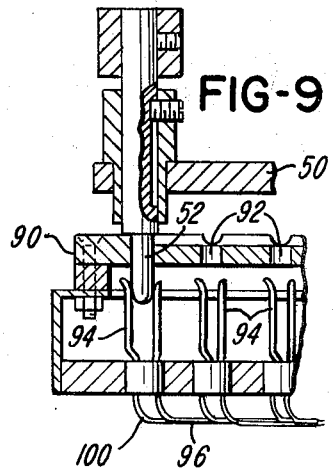
FIG. 9 is an enlarged sectional view taken substantially on line 9—9 of FIG. 8.

As illustrated in FIG. 7, the selector arm 50 may be moved so that the stem 52 moves into an aperture 92 in the selector plate 90 which is identified as "INDEX." When this occurs, the index frame or page is positioned under the lens in the lens holder 60 and the index page is projected by means of the mirros 62 and 64 and appears on the screen 66 in the manner illustrated in FIG. 7A. Each page or frame of the microfilm 54 has alignment markings, which may be of any suitable type or style. Herein alignment markings on a page or frame of the microfilm 54 are shown as being letters xxx which are adapted to be aligned with any suitable alignment markings on the screen 66, herein shown as being letters xxx. The alignment markings in the microfilm 54 do not need be identical or similar to the alignment markings on the screen 66. Alignment of the markings of the page of the microfilm 54 with the alignment markings on the screen 66 indicates that the projected page or frame of the microfilm 54 is properly aligned with respect to the screen 66. The index page as illustrated in FIG. 7A, contains an arrangement of the titles of the entire group of pages or frames on the microfilm 54 and the number of each page or frame as the page or frame is related to the selector plate 90. Then the number of the desired page is determined. For example, the index page projected upon the screen 66 shows that supply items may be found on page 15 of the microfilm 54.

Figure 8A:
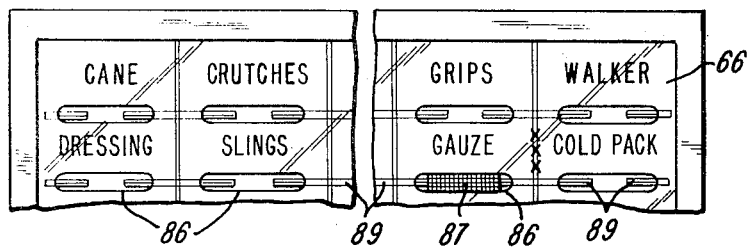
FIG. 8A is an elevational type of view, with parts broken away, of the screen with another portion of a film projected thereupon.
Figure 8B:
FIG. 8B is a greatly enlarged fragmentary elevational type of view of a portion of a film projected upon the screen in the manner shown in FIG. 8A.
Figure 8:
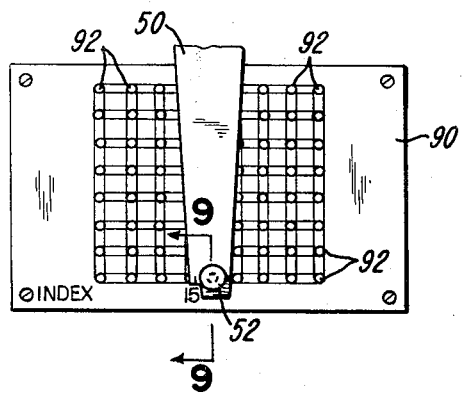
FIG. 8 is an elevational view, similar to FIG. 7, showing the elements of FIG. 7, but with the selector arm in a different position with respect to the selector plate.

After the number of the desired supply page (15) is determined by viewing the index page projected upon the screen 66, the selector arm 50 is then moved to a position in which the stem 52 is movable into an aperture numbered 15, as illustrated in FIG. 8. When the stem 50 moves through the aperture 92 numbered 15, the stem 52 engages and closes the switch 94 immediately below the aperture 92. When the switch 94 which is below the number 15 aperture closes, as illustrated in FIG. 10, a relay coil 102a and relay coil 98a are energized, closing relay contacts 110a and 110b, as illustrated in FIG. 11.

When the selector arm 50 is moved so that the stem 52 is movable through the aperture 92 which relates to the number 15, the microfilm 54 is moved so that page 15 of the microfilm 54 is projected upon the screen 66, as illustrated in FIG. 8A. FIG. 8B shows the alignment markings xxx which are aligned with similar markings on the screen 66 to indicate proper alignment of the microfilm 54 and the projected frame thereof with the screen 66. The projected page 15 upon the screen 66 shows various items of supply. As the supply page 15 is projected upon the screen 66, as shown in FIG. 8A, each item shown on the supply page 15 is directly above one of the switches 70. If, for example, a patient in the hospital is to be supplied gauze and is to be charged therewith, the magnet 87 is placed in the recess 86 immediately in front of the switch 70 which is below the item marked "gauze." Thus, the magnet 87 causes the switch 70 immediately below the word "gauze" to close. Closing of the switch 70, as illustrated in FIG. 10A, causes energization of the relay coil 78a and the relay coil 80a. Energization of the relay coils 78a and 80a causes closing of relay contacts 110c and 110d, as illustrated in FIG. 11.

Thus, circuits are partially completed to the actuator coils 120 which are positioned within the data collection machine 124. The data collection machine 124 may be any suitable machine which collects and/or stores and/or applies information to a receiver. For example, the machine 124 may punch information into a card or into a tape or may provide information to a magnetic tape or any other information or data receiver element or elements.

The commutator 132 is adapted to move successively to terminals 130a, 130b, 130c, 130d, etc., for applying information to proper locations on the card, tape, or the like, as the card, tape or the like moves with respect to a data applicator element. When the commutator 132 engages the terminal 130a, the actuator coil 120b is energized, through the previously closed relay contacts 110b, and information is applied by the data collection machine 124 to an information receiver element in the proper location or position. When the commutator 132 engages the terminal 130b, the actuator coil 120c is energized through the previously closed relay contacts 110c, and information is applied by the data collection machine 124 to a proper position on an information receiver element.

Likewise, when the commutator 132 engages the terminals 130c and 130d, information is properly applied to an information element which is operated upon by the data collection machine 124.

When the selector arm 50 is positioned in any desired location, so that the stem 52 is movable through one of the apertures 92, the switch 94 which is closed by the stem 52 operates through the circuitry shown in FIGS. 10 and 11 to properly identify the page of the microfilm 54 which is projected upon the screen 66. Also, when the selected page is so projected upon the screen 66, and when the magnet 87 is located to operate a switch 70 which is directly associated with a selected item on the selected page, the switch 70, which is closed by the magnet 87, properly establishes an electrical circuit as illustrated in FIGS. 10A and 11 to identify the item selected by the location of the magnet 87. Thus, the position of the selector arm 50 determines the page of the film 54 viewed on the screen 66, and by operation of the stem 52, proper relay contacts 110 of the circuitry shown in FIG. 11 are closed in accordance with the page viewed on the screen 66. In addition, the location of the magnet 87 causes closing of the proper relay contacts 110 to establish a circuit to the data collection machine 124 to apply information in accordance with the item selected on the page which is projected upon the screen.

Although the preferred embodiment of the apparatus has been described, it will be understood that within the purview of this invention various changes may be made in the form, details, proportion and arrangement of parts, the combination thereof, and the mode of operation, which generally stated consist in apparatus capable of carrying out the objects set forth, as disclosed and defined in the appended claims.

The invention having thus been described, the following is claimed:

1. In combination with film viewing apparatus, control apparatus for control of mechanism in accordance with a selected portion of a film projected upon a screen, the film having a plurality of pages, page selector means, including means for establishing electrical circuitry in accordance with the page selected, item selector means for selecting an item which is a part of the page selected, the item selector means including means for establishing electrical circuitry in accordance with the item selected, the screen having a plurality of portions, each portion of the screen including electric switch means with electric conductor means joined thereto.

2. The combination of claim 1 in which the item selector means includes means for operation of the switch means which is related to any one of said portions of the screen.

3. The combination of claim 2 in which the switch means are magnetically operated and in which the item selector means includes magnetic means.

4. The combination of claim 1 in which the page selector means includes mechanism for moving the film to project a page upon the screen and in which the page selector means includes electrical switch means operated by said mechanism and electrical conductor means joined to the electrical switch means for establishing electrical circuitry in accordance with a page selected by the page selector means and projected upon the screen.

5. In combination with a screen of a microfilm projector, the screen being adapted to have information projected thereupon at a plurality of portions thereof, a plurality of switch members positioned at spaced-apart locations adjacent the screen, selective operator means for operation of the switch members, data receiver means, means joining the data receiver means to the switch members, the selective operator means being operable to operate a switch member at a selected location on the screen to apply data to the data receiver means in accordance with information projected upon the selected location on the screen.

6. The combination of claim 5 in which the microfilm has a plurality of frames and which includes selector means for selection of a frame of the microfilm for projection upon the screen, switch means selectively operable by the selector means in accordance with the frame of the microfilm selected, means joining the switch means to the data receiver means for operation thereof to apply data to the data receiver means in accordance with the frame of the microfilm selected.

7. The combination of claim 6 in which there is one switch member for each frame of the microfilm.

8. The combination of claim 5 in which the operator means is magnetic means.

9. The combination of claim 8 which includes magnetizable means adjacent the screen and engageable by the magnetic means to retain the magnetic means in position.

10. In combination, a microfilm projector having a view screen and data collection mechanism, the microfilm projector comprising support means for supporting a film having a plurality of frames, a projector lens, selector means for relative movement between the support means and the projector lens for selecting a frame of the film for projection by the lens upon the view screen, first switch means, the first switch means indicating the frame of the microfilm which is selected by the selector means for projection by the lens upon the view screen, second switch means, the second switch means being adjacent the view screen of the projector and indicating a selected portion of the frame which is projected upon the view screen, means joining the first and second switch means to the data collection mechanism for providing data which corresponds with the frame selected and the selected portion of the frame.

11. The combination of claim 10 in which the view screen has alignment means, and in which the microfilm is of the microfiche type and in which each frame of the microfiche has alignment means adapted to be aligned with the alignment means of the view screen as the frame is projected upon the screen.

12. In combination with film viewing apparatus, control apparatus for control of mechanism in accordance with a selected portion of a film projected upon a screen, the film having a plurality of pages, page selector means, including means for establishing electrical circuitry in accordance with the page selected, item selector means for selecting an item which is a part of the page selected, the item selector means including means for establishing electrical circuitry in accordance with the item selected, the item selector means being in combination with electrical switch means located at selected portions of the screen and electrical conductor means for establishing electrical circuitry in accordance with an item selected by the item selector means as the item is projected upon the screen.

13. In combination with film viewing apparatus, control apparatus for control of mechanism in accordance with a selected portion of a film projected upon a screen, the film having a plurality of pages, page selector means, including means for establishing electrical circuitry in accordance with the page selected, item selector means for selecting an item which is a part of the page selected, the item selector means including means for establishing electrical circuitry in accordance with the item selected, a magnet and a plurality of magnetically operable switch members located adjacent the screen and indicating portions of the screen.

14. The combination of claim 13 which includes means adjacent the screen for supporting the magnet adjacent any one of the magnetically operable switch members.

15. In combination with film viewing apparatus, control apparatus for control of mechanism in accordance with a selected portion of a film projected upon a screen, the film having a plurality of pages, page selector means, including means for establishing electrical circuitry in accordance with the page selected, item selector means for selecting an item which is a part of the page selected, the item selector means including means for establishing electrical circuitry in accordance with the item selected, a projector lens, a page selector plate, the page selector means having a portion movable adjacent the selector plate for causing relative movement between the projector lens and a film, the selector plate having a plurality of page positions, there being one page position on the selector plate for each page position on the film, a plurality of electrical switch members, there being one electrical switch member adjacent each of the page positions on the selector plate, means carried by said portion of the page selector means for operation of a switch member which is adjacent any one of the page positions on the selector plate, and electrical circuit means joined to the electrical switch members.

16. In combination with film viewing apparatus, in which a film has a plurality of pages, and in which only one page of the film is projected upon the screen at any given time, mechanism for selecting a page of the film for projection upon the screen, switch means operable by said mechanism for establishing an electrical circuit in accordance with the page selected and projected upon the screen, the page selected and projected having a plurality of sections, section selector means for selecting a section of the page as the page is projected upon the screen, the section selector means including means at the section projected upon the screen for establishing an electrical circuit in accordance with the section selected.

* * * * *